United States Patent
Campbell et al.

(10) Patent No.: US 6,792,112 B1
(45) Date of Patent: Sep. 14, 2004

(54) ENCRYPTING COMMUNICATIONS BETWEEN WIRELESS MOBILE UNITS

(75) Inventors: Lowell Campbell, Calisbad, CA (US); Daniel Robertson, Encinitas, CA (US)

(73) Assignee: DENSO Corporation, Kariya (JP)

(*) Notice: Subject to any disclaimer, the term of this patent is extended or adjusted under 35 U.S.C. 154(b) by 0 days.

(21) Appl. No.: 09/528,236

(22) Filed: Mar. 17, 2000

(51) Int. Cl.[7] .............................................. H04N 7/167
(52) U.S. Cl. ......................... 380/270; 713/37; 713/255
(58) Field of Search ........................... 380/270, 37, 255

(56) References Cited

U.S. PATENT DOCUMENTS

| | | | | |
|---|---|---|---|---|
| 4,440,976 A | * | 4/1984 | Bocci et al. ................. | 380/277 |
| 4,979,188 A | * | 12/1990 | Kotzin et al. ................ | 375/254 |
| 6,026,130 A | * | 2/2000 | Rahmatullah et al. ...... | 375/340 |

* cited by examiner

*Primary Examiner*—Thomas R. Peeso
(74) *Attorney, Agent, or Firm*—Harness, Dickey & Pierce, PLC

(57) ABSTRACT

A wireless mobile unit includes a voice encoder circuit that receives an analog voice signal and creates digital voice data representing a user's voice. The mobile unit receives an encryption key entered by the user, typically on the keypad or through a voice recognition circuit, and stores the encryption key in a storage device. An encryption circuit encrypts the digital voice data using the encryption key. A transmitter then modulates the encrypted voice data onto an RF signal and transmits the RF signal to a base station in a wireless network. The base station uses the same encryption key to decrypt the signal before transmitting it to another base station or mobile unit. Signals transmitted from the base station to the mobile unit are encrypted and decrypted using a user-selected encryption key in a similar manner.

8 Claims, 3 Drawing Sheets

ENCRYPTING COMMUNICATIONS BETWEEN WIRELESS MOBILE UNITS

TECHNOLOGICAL FIELD

This application relates to communication between mobile units in a wireless network.

BACKGROUND

Some digital wireless communication networks use data encryption techniques to protect communications transmitted among base stations. In general, the base stations use one or more common key words, or encryption keys, to scramble the digital information passed among the base stations. These encryption keys are known only to the base stations and the people who administer the base stations. Intercepting a signal transmitted between two base stations yields no useful information without knowledge of the encryption key applied to the signal.

Unlike the base stations, mobile units in these wireless networks do not employ data encryption techniques. Therefore, intercepting a signal transmitted between a mobile unit and a base station is more likely to produce useful information than intercepting a signal transmitted between two base stations.

SUMMARY

A wireless mobile unit includes a voice encoder circuit that receives an analog voice signal and creates digital voice data representing a user's voice. The mobile unit receives an encryption key entered by the user, typically on the keypad or through a voice recognition circuit, and stores the encryption key in a storage device. An encryption circuit encrypts the digital voice data using the encryption key. A transmitter then modulates the encrypted voice data onto an RF signal and transmits the RF signal to a base station in a wireless network. The base station uses the same encryption key to decrypt the signal before transmitting it to another base station or mobile unit. Signals transmitted from the base station to the mobile unit are encrypted and decrypted using a user-selected encryption key in a similar manner.

Other embodiments and advantages will become apparent from the following description and from the claims.

DETAILED DESCRIPTION

Figure 1:
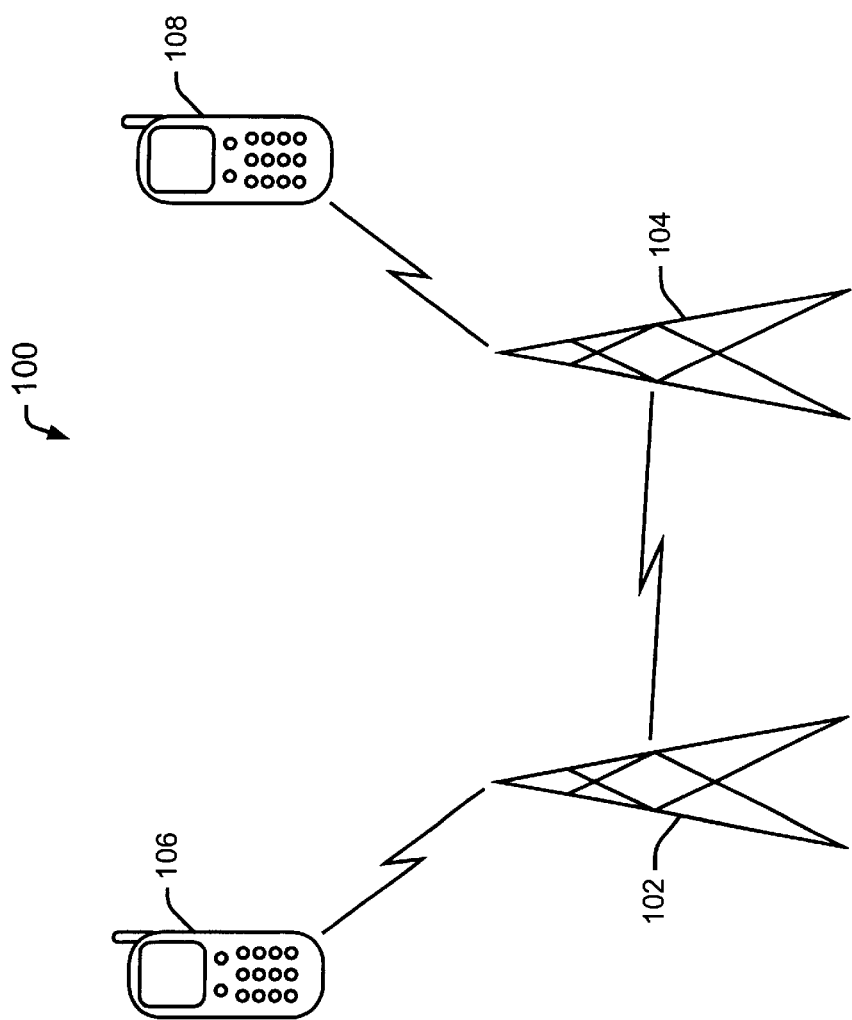
FIG. 1 is a schematic diagram of a digital wireless network.

FIG. 1 shows a digital wireless network 100, in which a series of geographically separated base stations 102, 104 support wireless communication between mobile units 106, 108. The wireless network 100 shown here is structurally similar to a conventional wireless network. However, unlike a conventional wireless network, this wireless network 100 supports data encryption of signals transmitted between a mobile unit 106, 108 and a base station. Signals transmitted from one of the mobile units to one of the base stations are encrypted using an encryption key entered into the mobile unit by a user. The base station decrypts the signals using this encryption key before performing the standard base station-to-base station encryption described above. Likewise, signals transmitted from the base station to the mobile unit are encrypted using the encryption key entered by the user. As a result, using a scanner to intercept a signal between one of the mobile units 106, 108 and one of the base stations 102, 104 is no more likely to produce useful information than intercepting a signal between the base stations 102, 104.

Figure 2:
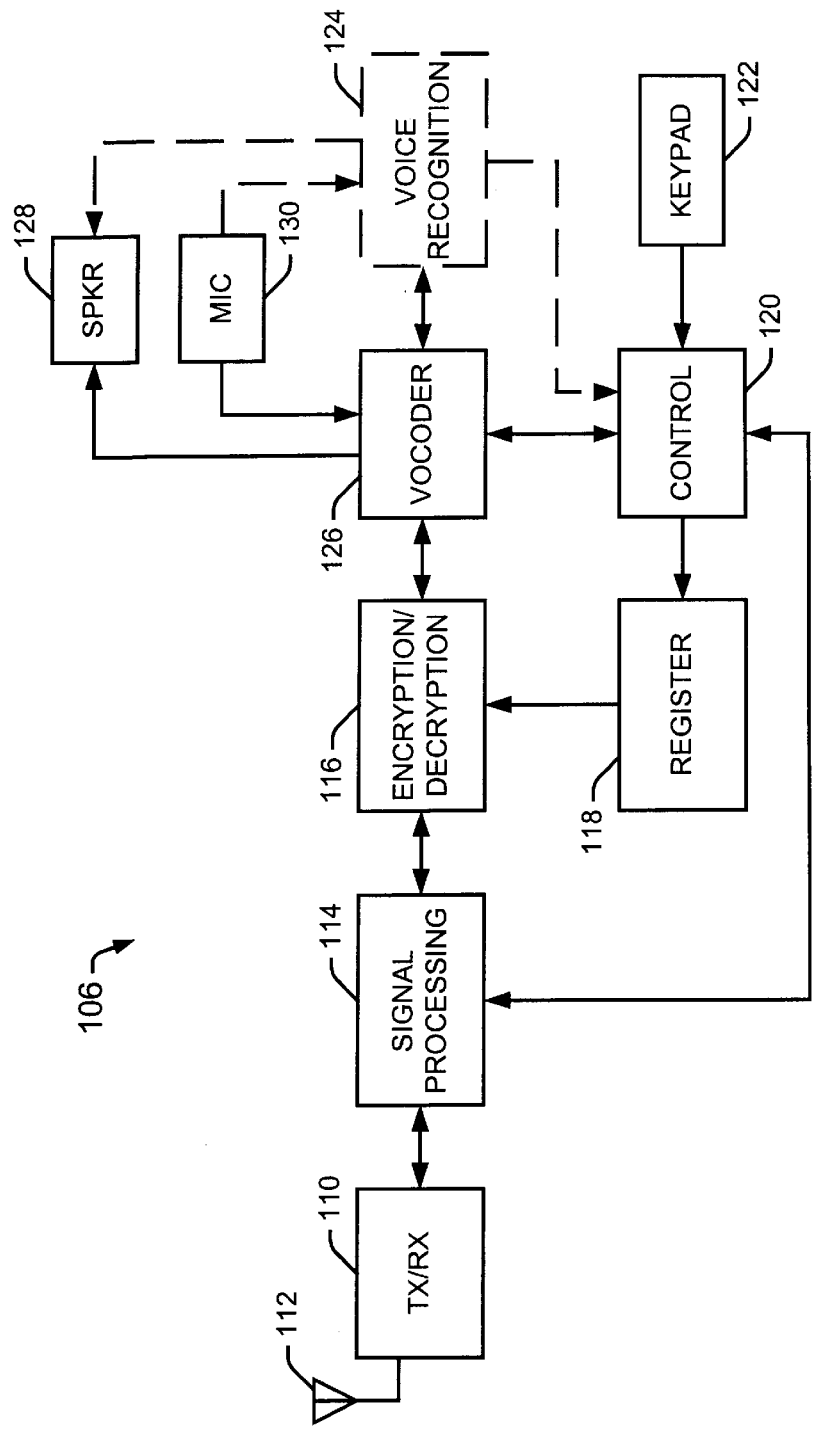
FIG. 2 is a block diagram of a mobile unit.

FIG. 2 shows one of the mobile units 106 in more detail. The mobile unit 106 includes a radio frequency (RF) transceiver circuit 110 that sends and receives RF-modulated, encrypted signals over the wireless network through an RF antenna 112. When acting as a receiver, the transceiver circuit 110 downconverts the incoming signal from its RF carrier frequency to baseband. A signal processing block 114 receives the encrypted baseband signal and prepares the signal for voice and/or data recovery. Functions commonly performed by the signal processing block 114 are analog-to-digital conversion, automatic gain control, and spectral filtering. In a mobile unit that uses a spread spectrum communication technique, such as code division multiple access (CDMA), the signal processing block 114 also despreads the encrypted signal.

The signal processing block 114 delivers the encrypted signal to an encryption/decryption circuit 116. The encryption/decryption circuit 116 decrypts the signal using an encryption key stored in a storage device 118, such as a programmable register or a read-only memory (ROM) device. A controller 120, such as a programmable processor or microcontroller, loads the encryption key into the storage device after receiving the encryption key from an input device, such as a keypad 122 or an optional voice recognition circuit 124, as described in more detail below.

The encryption/decryption circuit 116 delivers the decrypted signal to a vocoder circuit 126, which recovers digital voice information from the signal and uses this information to generate an analog sound signal representing the voice of the person who initially transmitted the signal. The vocoder circuit 126 delivers the sound signal to a speaker 128, or earpiece.

The mobile unit 106 operates similarly, but in the opposite order, when transmitting signals to the wireless network. In particular, the vocoder circuit 126 receives an incoming analog sound signal from a microphone 130, converts the analog sound signal into a digital voice signal, and delivers the digital voice signal to the encryption/decryption circuit 116. The encryption/decryption circuit 116 retrieves the encryption key from the storage device 118 and uses the encryption key to encrypt the digital voice signal. The signal processing block 114 and the transceiver circuit 110 then prepare the signal for transmission over the wireless network.

In general, the two mobile units 106, 108 use encryption keys that are entered into the units dynamically by the users of the mobile units 106, 108. Techniques for entering an encryption key into a mobile unit include typing the key onto the phone's keypad and using voice recognition circuitry to capture a key word spoken by the user, as described below.

Figure 3:
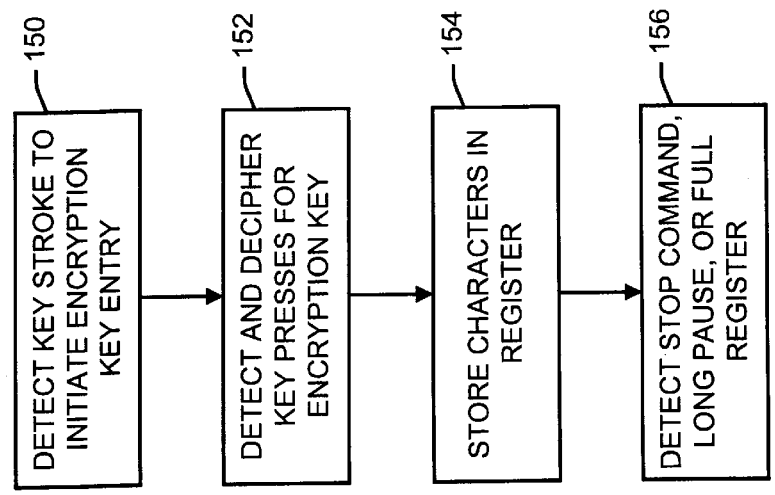

FIG. 3 shows one technique for entering the encryption key into the mobile unit dynamically. The user of the mobile unit initiates the process by pressing an assigned key or sequence of keys on the mobile unit's keypad. The controller in the mobile unit detects the prescribed keystroke and prepares to receive the encryption key (step 150). As the user enters the encryption key on the keypad, the controller detects the key presses and deciphers the character associated with each key press (step 152). Upon deciphering each character, the controller loads the character into the storage device (step 154). The controller stops entering characters into the storage device when the user enters an assigned keystroke or sequence of keystrokes, when a pause of predetermined length occurs between keystrokes, or when the storage device becomes full (step 156). In most implementations, a small, low-cost storage device, such as 64-bit register, is used, so the encryption key is limited to only a few, e.g., eight ASCII characters.

Figure 4:
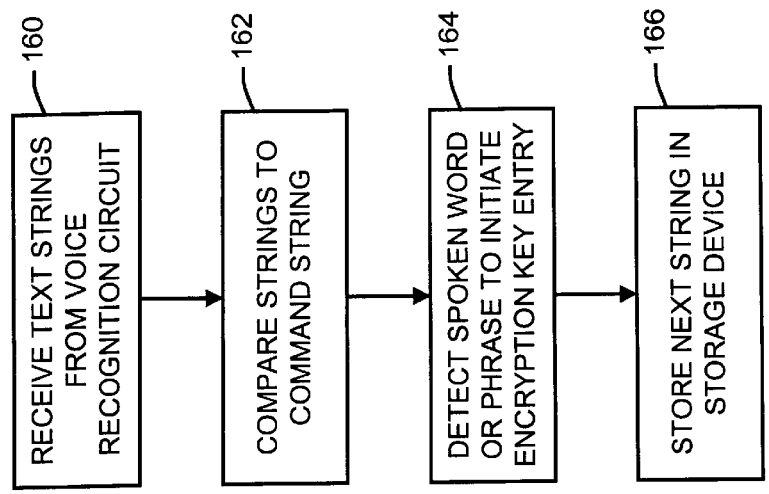
FIGS. 3 and 4 are flow charts illustrating techniques for entering an encryption key into a mobile unit.

FIG. 4 shows another technique for entering the encryption key into the mobile unit dynamically. This technique uses the optional voice recognition circuit to capture oral commands from the user of the mobile unit. The voice recognition circuit continuously deciphers the words spoken by the user and converts each deciphered word into a string of ASCII text. The controller in the mobile unit receives the text strings from the voice recognition circuit (step 160) and compares each text string to a stored command string (step 162). The command string represents a preassigned word or phrase, such as "enter encryption key," that the user utters when an encryption key is to be stored. Upon detecting the command string in the user's speech (step 164), the controller stores the next received text string as the encryption key (step 166). In some implementations, the user is allowed to enter an encryption key that includes multiple text strings. In these implementations, the controller continues storing text strings until the storage device is full or until the controller receives another command string indicating that the user has finished entering the encryption key.

In general, both the mobile unit and the base station must monitor the user's keystrokes or spoken words, as described above, to identify the key word selected by the user. In some embodiments, the system uses line filtering to ensure that line noise does not preclude proper identification of the user-selected key. Some of the embodiments in which voice recognition is used identify individual letters in the user's speech, rather than entire key words. In these embodiments, the user generally spells the key word after entering or speaking the command string.

A number of embodiments of the invention are described above. A person of ordinary skill will recognize that various modifications are possible without departing from the spirit and scope of the invention. For example, some voice recognition embodiments allow the user to perform a sequence of keystrokes to indicate that a spoken key word is coming. This frees the voice recognition circuitry from having to monitor the user's speech continuously. Accordingly, other embodiments are within the scope of the following claims.

What is claimed is:

1. A mobile unit for use in a wireless network comprising:
   a voice encoder circuit configured to receive an analog voice signal and to create digital voice data representing a user's voice;
   a storage device configured to store an encryption selected and entered into the mobile unit by the user of the mobile unit;
   an encryption circuit coupled to the voice encoder circuit and the storage device, and configured to encrypt the digital voice data using the user-selected encryption key;
   a transmitter coupled to the encryption circuit and configured to modulate the encrypted voice data onto a radio frequency (RF) signal and to transmit the RF signal over the wireless network; and
   a voice recognition circuit configured to receive a sound signal representing a vocalization of the encryption key and to convert the sound signal into digital data representing the encryption key.

2. The mobile unit of claim 1, further comprising a controller coupled to the voice recognition circuit and configured to deliver the digital data representing the encryption key to the storage device.

3. The mobile unit of claim 2, wherein the controller is configured to recognize a predetermined pattern of digital data representing a spoken command that indicates that the encryption key is to be given verbally.

4. A mobile unit for use in a wireless network comprising:
   receiver circuitry configured to receive a radio frequency (RF) signal and to recover encrypted data representing a person's voice;
   a storage device configured to store a decryption key selected and entered into the mobile unit by a user of the mobile unit;
   a decryption circuit coupled to the receiver circuitry and the storage device, and configured to decrypt the encrypted data using the user-selected decryption key;
   a voice decoder circuit coupled to the decryption circuit and configured to convert the decrypted data into an analog signal representing a reproduction of the person's voice; and
   a voice recognition circuit configured to receive a sound signal representing a vocalization of the decryption key and to convert the sound signal into digital data representing the decryption key.

5. The mobile unit of claim 4, further comprising a controller coupled to the voice recognition circuit and configured to deliver the digital data representing the decryption key to the storage device.

6. The mobile unit of claim 5, wherein the controller is configured to recognize a predetermined pattern of digital data representing a spoken command that indicates that the decryption key is to be entered verbally.

7. A method for use in transmitting a signal between a mobile unit and a base station in a wireless network, the method comprising:
   receiving an analog voice signal representing a person's voice;
   converting the analog signal into digital voice data;
   receiving a user-selected encryption key entered into the mobile unit by the user;
   encrypting the digital voice data using the user-selected encryption key;
   modulating the encrypted voice data onto a radio frequency (RF) signal; and
   transmitting the RF signal between a mobile unit and a base station in the wireless network; wherein
   receiving the encryption key includes receiving one or more ASCII characters; and
   receiving the encryption key includes receiving the ASCII characters from a keypad on the mobile unit.

8. A method for use in transmitting a signal between a mobile unit and a base station in a wireless network, the method comprising:
   receiving an analog voice signal representing a person's voice;
   converting the analog signal into digital voice data;
   receiving a user-selected encryption key entered into the mobile unit by the user;
   encrypting the digital voice data using the user-selected encryption key;
   modulating the encrypted voice data onto a radio frequency (RF) signal; and transmitting the RF signal between a mobile unit and a base station in the wireless network; wherein receiving the encryption key includes receiving a sound signal representing a vocalization of the encryption key and converting the sound signal into digital data representing the encryption key.

* * * * *